T. G. WARDWELL & H. A. CURRIER.
Buoy for Indicating Sunken Vessels.

No. 222,215. Patented Dec. 2, 1879.

Witnesses.
S. N. Piper
W. W. Lunt

Inventors
Thomas G. Wardwell.
Henry A. Currier.
by attorney

UNITED STATES PATENT OFFICE.

THOMAS G. WARDWELL AND HENRY A. CURRIER, OF METHUEN, MASS.

IMPROVEMENT IN BUOYS FOR INDICATING SUNKEN VESSELS.

Specification forming part of Letters Patent No. 222,215, dated December 2, 1879; application filed October 13, 1879.

*To all whom it may concern:*

Be it known that we, THOMAS G. WARDWELL and HENRY A. CURRIER, of Methuen, of the county of Essex and State of Massachusetts, have invented a new and useful Apparatus for Indicating the Place of Sinking of a Navigable Vessel; and we do hereby declare the same to be described in the following specification, and represented in the accompanying drawings, of which—

Figure 1:
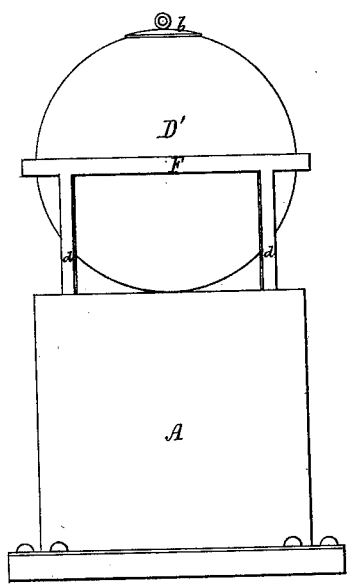
Figure 2:
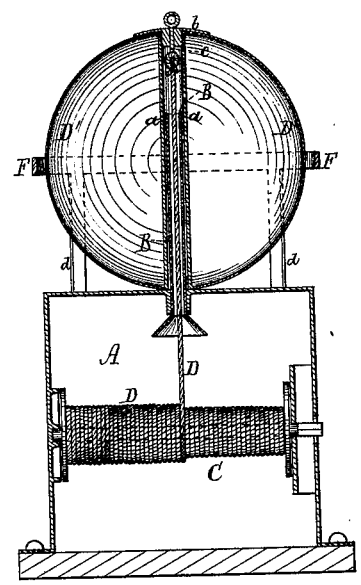

Figure 1 is a side elevation, and Fig. 2 a transverse section, of our said invention or sunken-vessel indicator, the nature of which is fully defined in the claims hereinafter presented.

In the said drawings, A denotes a cubical box or case having a tubular standard, B, extending upward from and opening into it at the central part of its top. Within and extending across the said box is a reel, C, to be revolved by a handle or a key applied to one journal of it. This reel is to revolve freely within the box, and, besides, is to have a line or cord, D, fixed to it, such line being wound around the reel and extended up through the standard B, and fastened to a hollow ball or float, D'. The said float has a tube, a, going through it diametrically, the tube at its ends being fastened by air and water tight joints to the float. A cap, b, screwed into the tube at its upper end, and provided at its lower end with a staple or eye, c, serves as a means of fixing the line to the float, whose tube receives the standard B. A guard or ring, F, supported by a series of posts, d, erected on the case, extends around the float, and is to protect it or prevent it from being accidentally thrown off its spindle or standard.

We sometimes dispense with the reel and coil the line within the case; but it is better to have the reel. So the hollow standard may be dispensed with, and the float may be without the internal tube to receive the standard; but it is far better to have both standard and tube.

The apparatus so made is to have its case fastened at the base thereof to the upper surface of the taffrail or some other suitable part of a ship or navigable vessel. In case of the vessel springing a leak and sinking while at sea, the float attached by its line to the vessel will rise to the surface of the water and indicate the position of the vessel, whose name should be painted or otherwise suitably fixed on the float. The purpose of the hollow standard of the case and the perforation or tube in the float for reception of such standard is to keep the line dry, or from being wet.

We claim as our invention as follows:

1. The sunken-vessel indicator having its case provided with the tubular standard and its float provided with the line, and perforated or furnished with the tube to receive the said standard.

2. The case provided with the reel and line and the tubular standard, in combination with the float perforated or provided with the tube to receive the said standard, as set forth.

3. The case provided with the guard and hollow standard, in combination with the float arranged, or to be arranged, within the guard, and perforated or provided with a tube to receive the standard, as set forth, such float being connected with the case or with a reel therein by means of a line or cord, as explained.

THOS. G. WARDWELL.
HENRY A. CURRIER.

Witnesses:
R. H. EDDY,
S. N. PIPER.